(12) United States Patent
Thompson et al.

(10) Patent No.: US 7,031,828 B1
(45) Date of Patent: Apr. 18, 2006

(54) ENGINE MISFIRE DETECTION SYSTEM

(75) Inventors: John M. Thompson, 100 Wax Myrtle Ct., Cary, NC (US) 27513; Kenneth W. Auer, Fuquay-Varina, NC (US)

(73) Assignee: John M. Thompson, Cary, NC (US)

( * ) Notice: Subject to any disclaimer, the term of this patent is extended or adjusted under 35 U.S.C. 154(b) by 0 days.

(21) Appl. No.: 10/651,054

(22) Filed: Aug. 28, 2003

(51) Int. Cl.
*G06G 7/70* (2006.01)

(52) U.S. Cl. .................. 701/114; 701/109; 701/101; 123/673

(58) Field of Classification Search ............... 701/114, 701/100, 101, 109; 123/673
See application file for complete search history.

(56) References Cited

U.S. PATENT DOCUMENTS

| | | | |
|---|---|---|---|
| 4,417,467 A * | 11/1983 | Higgs et al. | 73/117.3 |
| 5,199,408 A * | 4/1993 | Wataya | 123/672 |
| 5,228,287 A * | 7/1993 | Kuronishi et al. | 60/276 |
| 5,826,426 A * | 10/1998 | Weber et al. | 60/274 |
| 5,904,131 A * | 5/1999 | O'Neill et al. | 123/683 |
| 6,216,664 B1 * | 4/2001 | Bochum et al. | 123/305 |
| 6,314,952 B1 * | 11/2001 | Turin et al. | 123/673 |
| 6,499,474 B1 * | 12/2002 | Wachi et al. | 123/673 |
| 6,694,243 B1 * | 2/2004 | Shi et al. | 701/114 |

OTHER PUBLICATIONS

Larry Carley, "Decoding On-Board Diagnostics," downloaded from www.aa1car.com, Aug. 5, 2003, 4 pages.
"Lambda Sensor," downloaded from www.nernst.de/lambda-sensor.htm, Aug. 12, 2003, 2 pages.
"Lambda Sensor (Titania) Waveform," downloaded from www.picotech.com/auto/waveforms/lambda_titania.html, Aug. 12, 2003, 2 pages.
Product brochure for Lambda Sensor LSM 11, produced by Robert Bosch (Australia) Pty Ltd, dated Oct. 17, 2001, 2 pages.
Peter J. Maloney, "A Production Wide-Range AFR Sensor Response Diagnostic Algorithm for Direct-Injection Gasoline Application," SAE Technical Paper Series, 2001-01-0558, reprinted from Electronic Engine Controls 2001: Modeling, Controls, OBD and Neutral Networks (SP-1585), presented at SAE 2001 World Congress, Mar. 5-8, 2001, downloaded from www.delphi.com/pdf/techpapers/2001-01-0558.pdf, 8 pages.
Product brochure for Automotive Diagnostics Kit, downloaded from www.picotech.com/auto/automotive_kit.html, Aug. 14, 2003, 7 pages.

(Continued)

*Primary Examiner*—Willis R. Wolfe
*Assistant Examiner*—Johnny H. Hoang
(74) *Attorney, Agent, or Firm*—Withrow & Terranova, PLLC

(57) ABSTRACT

An engine misfire detection system includes a database of engine fingerprints, each fingerprint corresponding to a known misfire condition. A technician uses software to compare the fingerprints in the database to an engine with a combustion inefficiency to determine which cylinder in the engine has the combustion inefficiency. The fingerprints are generated by evaluating an output from a lambda sensor and a timing reference. An alternate embodiment associates oxygen sensors with each of the cylinders in the engine and infers combustion inefficiency when a given sensor detects a peak in the amount of oxygen.

25 Claims, 11 Drawing Sheets

OTHER PUBLICATIONS

Product brochure for High Resolution Oscilloscopes for Automotive Diagnostics, downloaded from www.picotech.com/auto/automotive_oscilloscope.html, Aug. 14, 2003, 2 pages.

Media release, "Save Fuel and the Environment: Have Your Lambda ($O_2$) Sensor Checked Regularly in the Workshop," Robert Bosch (Australia) Pty Ltd, Sep. 11, 2002, 1 page.

Mark Warren, "Tech to Tech: Standardizing On-Board Diagnostics," originally published in AutoInc. Magazine, vol. XLV, No. 6, Jun. 1997, 3 pages.

Larry Hammer, "Platinum Spark Plugs: Justifying Their Cost," Tech Tip, Mighty Auto Parts, Mighty Distributing System of America, Inc., 4 pages.

Colorado State University, Case Study 8—Ford P0304, P0301 Codes: "Misfire—Problem or Solution?" downloaded from www.obdiiscu.com/Studies/2002CaseStudies/Misfire/Misfire.html, Aug. 5, 2003, 3 pages.

* cited by examiner

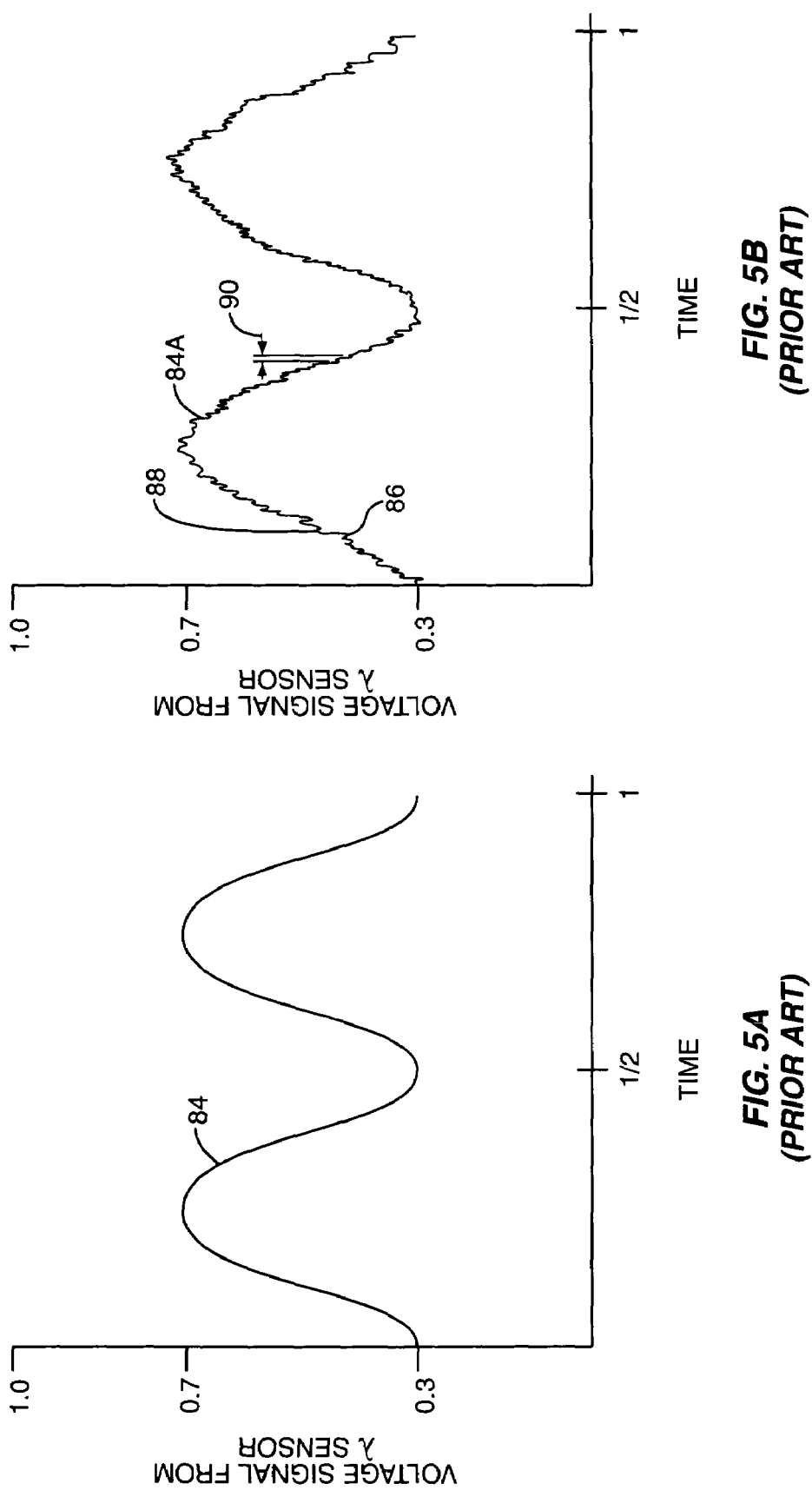

ENGINE MISFIRE DETECTION SYSTEM

FIELD OF THE INVENTION

The present invention is directed to a technique for detecting which cylinder in an engine is misfiring and detecting other combustion inefficiencies.

BACKGROUND OF THE INVENTION

It is difficult to imagine a world without automobiles. From school buses to taxis to the family sedan, automobiles have become an integral part of daily life for most individuals. Arguably the most important element of the automobile is its engine. Almost all engines are internal combustion engines that have one or more cylinders. A piston is movably positioned within the cylinder and connected to a crankshaft by a rod. The movement of the piston turns the crankshaft providing motive force to the wheels of the vehicle.

Engines typically operate using a four stroke combustion cycle, also known as the Otto cycle. The four strokes are: 1) the intake stroke, where the piston moves from an in position to an out position, drawing fuel and air into the cylinder; 2) the compression stroke, where the piston moves from the out position to the in position, compressing the fuel and air mixture in the cylinder; 3) the combustion stroke, where a spark plug emits a spark, igniting the fuel and air mixture, causing an explosion that propels the piston to the out position; and 4) the exhaust stroke, where the piston moves back to the in position, forcing the exhaust fumes from the cylinder. Valves permit the introduction of fuel and air, and another valve allows the expulsion of the exhaust fumes.

This cycle is made inefficient when a misfire occurs. A misfire is commonly thought of by those in the automotive industry as the total lack of combustion in the cylinder. Over the years, the automotive industry has identified several suspects that can cause misfires. The first primary suspect is the spark plug. The spark plug may not be providing a spark to the compressed fuel/air mix and thus, no combustion happens. The second primary suspect is a bad fuel mix. This may be the result of a clogged fuel injector, a clogged air intake, or both. Essentially, the fuel and the air are not being introduced into the cylinder in the proper ratio to achieve combustion. The final primary suspect is a lack of compression, such as when the seals in the cylinder fail and allow the fuel/air mixture to leak out as the piston attempts to compress the mixture. Those skilled in the art will recognize that there are other reasons for a lack of combustion, and that there may be other causes even within the primary suspects outlined here. For example, a bad fuel mix may be the result of an empty gas tank.

Misfires are a cause for concern for vehicle operators. When a misfire occurs, the fuel in the cylinder does not combust and is sent out the exhaust valve. This unburned fuel then passes out through the exhaust system of the vehicle. This results in lower fuel efficiency as well as additional wear and tear on catalytic converters. Thus, vehicle operators may take their vehicle to a service technician for repair if the operator suspects that the engine is misfiring. However, generally knowing what may cause a misfire does not greatly help the service technician identify which cylinder is misfiring.

The United States government has decided that misfires are a cause for concern relative to the environment. Specifically, the unburned fuel that is expelled through the exhaust system of the vehicle may contribute to air pollution. In 1996, legislation was passed that required vehicle computers to perform onboard detection of misfiring. Further, this legislation requires that the cylinder that is misfiring be pinpointed and identified by the onboard computer. Initial efforts to detect misfires focused on the crankshaft and its rotational speed. The theory behind these efforts was that a misfire would cause the crankshaft to slow down momentarily. However, it was soon discovered that vibrations, such as those caused by bumpy roads, also caused the crankshaft to slow down, which could result in a false positive. As a result, the regulations that implemented the legislation were eased to allow for less sensitive sensors. Now the sensors operate with a timing threshold and indicate a misfire if a periodic slowing of the crankshaft occurs for more than a predetermined amount of time. These sensors may still report false positives, and further, these sensors do not report combustion inefficiencies short of a total misfire. More information on this topic can be found at Carley's "Decoding Onboard Diagnostics," submitted in the Information Disclosure Statement. Thus, there is still a need for a technique that allows compliance with the 1996 statute.

While the detection of misfires is certainly a laudable goal, it is not the only thing that the automotive industry has done to reduce pollution. Catalytic converters were introduced to burn non-combusted fuel in the exhaust path. Catalytic converters store oxygen therein and use this oxygen to burn fuel that was not burned in the engine. By burning fuel in the catalytic converter, fewer hydrocarbons are released into the atmosphere.

It has further been discovered that the optimal combustion of fuel occurs when the air to fuel ratio is 14.7:1 while the engine is idling. This ratio is sometimes called lambda. To avoid placing undue strain on the catalytic converters, a lambda sensor is placed in the exhaust system. The lambda sensor senses oxygen levels in the exhaust and communicates with the vehicle's onboard computer via a voltage signal. The voltage signal of the lambda sensor decreases as oxygen levels increase and increases as oxygen levels decrease. Because the lambda sensor detects oxygen levels, it is sometimes called an oxygen sensor. The onboard computer examines the level of oxygen and infers that the air to fuel mixture is too lean or too rich. The onboard computer can then adjust the fuel injectors and/or the air intake systems to provide the desired air to fuel ratio.

To date, no one has used the lambda sensors to detect misfires in the engine, and it has been hypothesized that it would be impossible to link the lambda sensor to a particular cylinder misfiring.

SUMMARY OF THE INVENTION

The present invention detects combustion inefficiencies by monitoring the oxygen level in the exhaust path. If the oxygen level peaks, it may be inferred that there was an incomplete explosion in one of the cylinders. The present invention further links the peak in the oxygen level to a particular cylinder.

In a first embodiment, a plurality of sensors is placed in an exhaust manifold. Preferably, each cylinder of the engine has an associated sensor proximate thereto. When a given cylinder vents exhaust that has a high oxygen level, the high oxygen level is detected by the associated sensor and the cylinder is identified as potentially having combustion inefficiency. The sensors may communicate with an onboard computer so that this condition may be monitored and an alarm generated if desired.

A second embodiment addresses testing engines that do not have the sensors of the first embodiment. As such, this embodiment is a software tool that a service technician can use to identify which cylinder in the vehicle is misfiring. This embodiment connects a monitor to a lambda sensor already present in the exhaust path of the vehicle. Concurrently, a timing reference is generated that references when the first cylinder of the engine is in the combustion stroke. If there is a peak in the level of oxygen in the exhaust path, a misfire or other combustion inefficiency may be inferred. To link the peak in the oxygen level to a particular cylinder, additional information is required.

The additional information comprises a database of "fingerprints" or "signatures" for engine types. The length of time between the timing reference point and the peak in the oxygen level is established and compared to the fingerprint or signature for the engine type. From this comparison, the software tool can determine which cylinder is misfiring.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIGS. 5A and 5B illustrate display outputs from the testing device of FIG. 4;

DETAILED DESCRIPTION OF THE PREFERRED EMBODIMENTS

Figure 1B:
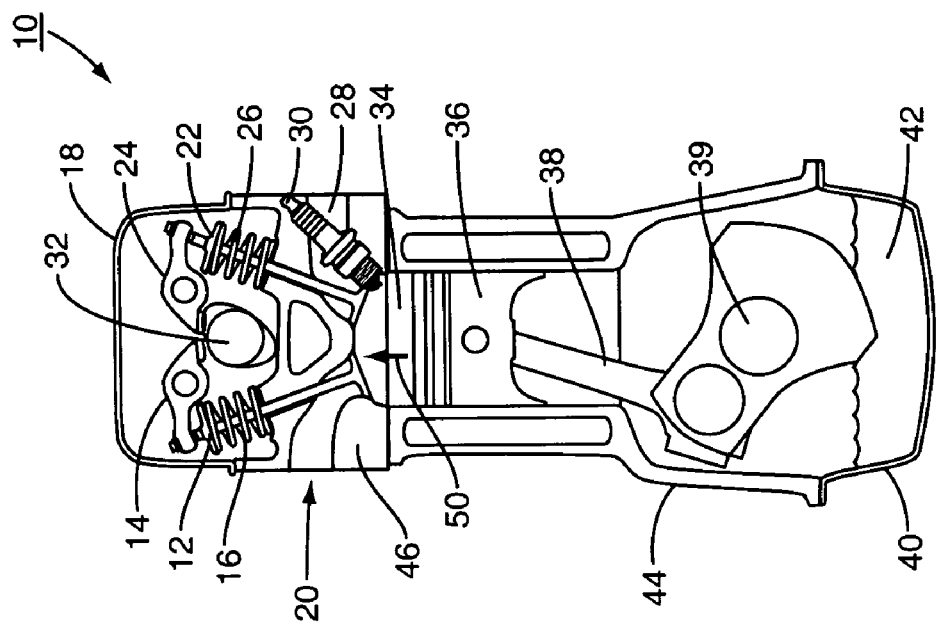
FIGS. 1A–1D illustrate the four stages of a single cylinder of a conventional four-cycle internal combustion engine.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is designed to detect combustion inefficiencies by linking peaks in oxygen levels to an incomplete combustion cycle in a particular cylinder. There are two primary techniques by which this detection and linking can occur. However, before describing the present invention, a review of an internal combustion engine is provided so that the invention is placed in its proper context.

FIGS. 1A–1D illustrate an internal combustion engine 10 in the four steps of the Otto cycle. The engine 10 includes an intake valve 12 controlled in part by a rocker arm 14 and a spring 16. A valve cover 18 may be positioned over the intake valve 12. The intake valve 12 is positioned in an intake port 20. Collectively this forms the intake of the engine. While not illustrated, it should be understood that a fuel injector and an air intake are fluidly coupled to the intake port 20.

On the exhaust side, an exhaust valve 22 is controlled in part by a rocker arm 24 and a spring 26. The exhaust valve 22 is positioned in an exhaust port 28. The valve cover 18 may also cover the exhaust valve 22. A spark plug 30 may be positioned proximate the exhaust valve 22. A camshaft 32 has cam surfaces that sequentially trigger rocker arms 14 and 24 as camshaft 32 rotates.

The intake port 20 and the exhaust port 28 are selectively fluidly connected to the cylinder 34. A piston 36 is positioned within the cylinder 34. The piston 36 is connected to a rod 38 which in turn is connected to a crankshaft 39. The crankshaft 39 dips into oil pan 40 so that oil in oil sump 42 may be used to lubricate the moving parts of the engine 10. The engine 10 is enclosed by engine block 44 and head 46.

During operation, the engine 10 goes through four stages of the Otto cycle. FIG. 1A illustrates the intake stroke. During the intake stroke, the piston 36 moves from an in position to an out position (illustrated generally by arrow 48). Intake valve 12 is open, allowing a fuel and air mixture to flow into the cylinder 34. Exhaust valve 22 is closed.

Figure 1A:
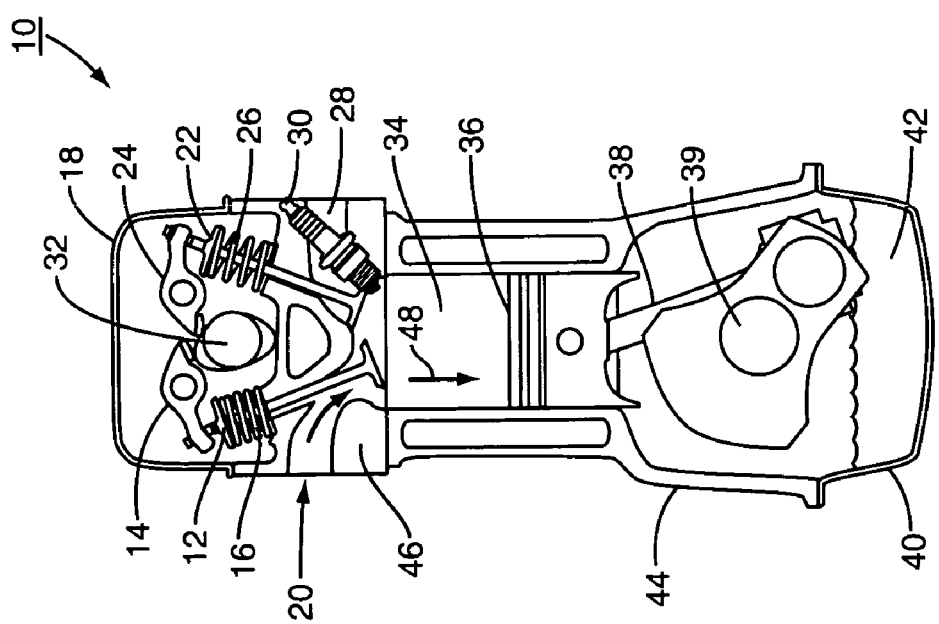

FIG. 1B illustrates the compression stroke. The piston 36 moves from the out position to the in position (illustrated generally by arrow 50). Both the intake valve 12 and the exhaust valve 22 are closed. This compresses the fuel and air mixture.

Figure 1C:
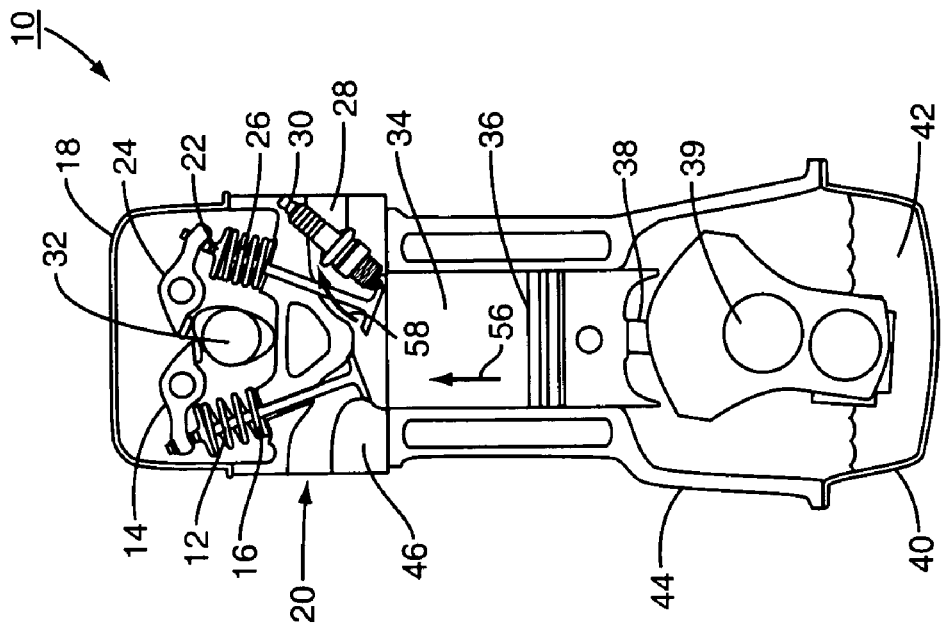

FIG. 1C illustrates the combustion stroke. The spark plug 30 emits a spark 52, which causes the fuel and air mixture to explode. The force of the explosion pushes the piston 36 to the out position (illustrated generally by arrow 54), which in turn pushes the crankshaft 39 and provides the motive force. Both intake valve 12 and the exhaust valve 22 remain closed.

Figure 1D:
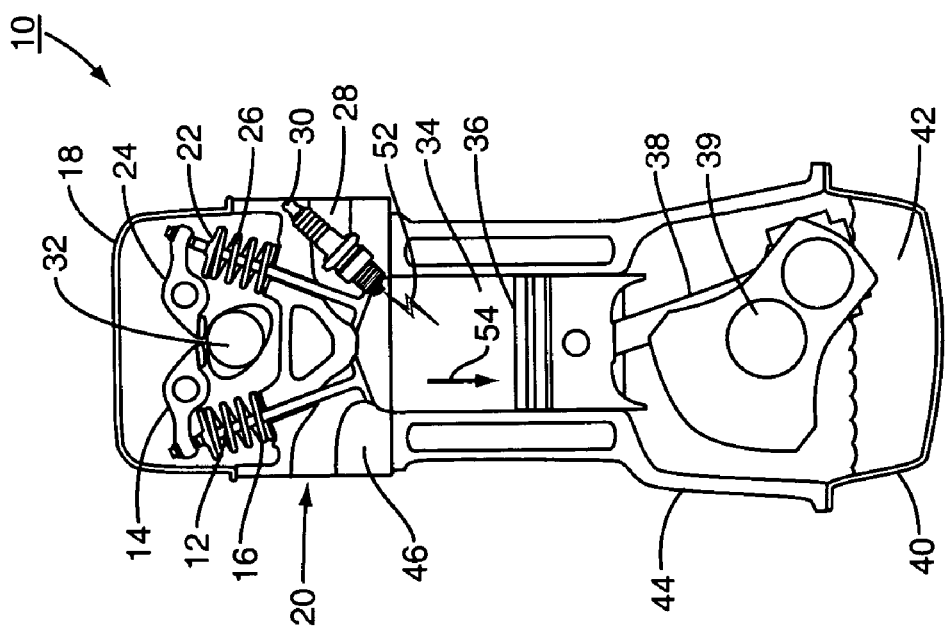

FIG. 1D illustrates the exhaust stroke. The exhaust valve 22 opens, and the piston 36 moves from the out position to the in position (illustrated generally by arrow 56), pushing the contents of the cylinder 34 out through the exhaust port 28 (illustrated generally by arrow 58).

Figure 2:
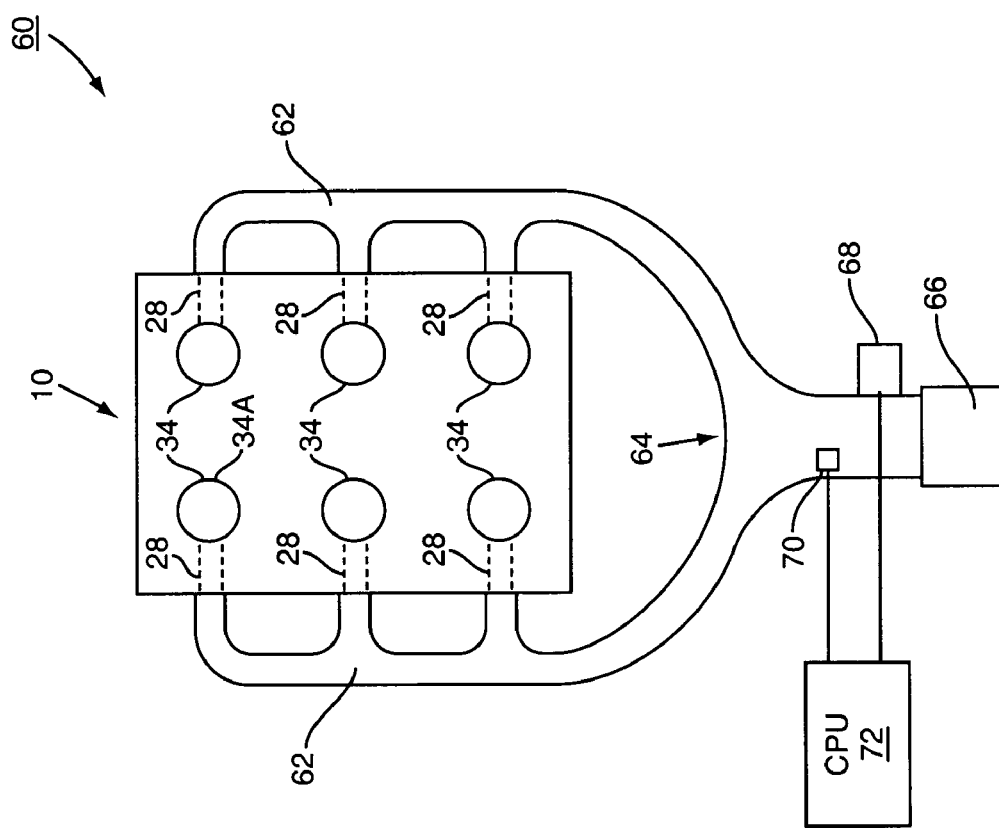
FIG. 2 illustrates a conventional exhaust system for an engine.

An exemplary simplified schematic of an exhaust system 60 is illustrated in FIG. 2. Engine 10 includes a plurality of cylinders 34 (a V-6 is illustrated, having six cylinders arranged in a V-format). The exhaust ports 28 connect to exhaust manifold 62 on either side of the engine 10. Exhaust flows into the exhaust manifold 62 down to a Y-intersection 64 and thence to a muffler 66 for expulsion into the atmosphere. A catalytic converter 68 may be associated with the exhaust system 60 if needed or desired. A lambda sensor 70 may be positioned within the exhaust system 60. As illustrated, the lambda sensor 70 is positioned upstream of the catalytic converter 68. Some vehicles may have an additional lambda sensor (not illustrated) positioned downstream of the catalytic converter 68. The additional lambda sensor may be used to determine the efficiency or functionality of the catalytic converter 68.

It should be appreciated that engine manufacturers typically designate one cylinder 34 of a multi-cylinder engine 10 as the first cylinder (denoted herein cylinder 34A or first cylinder 34A). Likewise, the firing order of the cylinders 34 in a multi-cylinder engine 10 is published by the manufacturer. Thus, the lambda sensor 70 will typically receive exhaust from the cylinders 34 in the firing order of the cylinders 34.

Lambda sensors are also known as oxygen sensors and are commercially available from many vendors, including Robert Bosch Pty. Ltd. of 1555 Centre Street, Clayton, Victoria 3168, Australia under the trade name LSM 11. The lambda sensor 70 was originally designed to operate in conjunction with the vehicle's central processing unit (CPU) 72 to control the catalytic converter 68 as is well understood. The lambda sensor 70 may also cooperate with the CPU 72 to control the air to fuel mixture that is provided to the engine for combustion. This process is also well understood and outside the scope of the present invention. Lambda sensors typically come in two varieties: zirconia and titania. These lambda sensors operate on the same principle: as oxygen levels increase, a voltage signal from the sensor will decrease. Zirconia lambda sensors operate with a one volt range and titantia lambda sensors operate with a five volt range. A typical operating range for a zirconia lambda sensor is 0.2 to 0.8 V. Conventional wisdom indicates that if an oxygen sensor can react to a change in oxygen level within 100–125 milliseconds, the oxygen sensor is working properly. For further information about lambda sensors, the interested reader is referred to www.nenrst.de/lambda-sensor.htm and www.picotech.com/auto/waveforms/lamba_titania.html, both of which are submitted in the Information Disclosure Statement of the present disclosure. Conventional use of a lambda sensor is well understood in the industry.

During normal operation, the contents of the cylinder 34 that are exhausted into the exhaust manifold 62 contain little, if any, fuel or oxygen. When combustion inefficiency, defined herein as an incomplete explosion in the combustion stage up to and including a misfire in which no explosion took place, occurs, fuel and oxygen remain in the cylinder 34 and are pushed out of the exhaust port 28 during the exhaust stage. The oxygen that is pushed out of the exhaust port 28 during the exhaust stage shows up as a peak in the amount of oxygen at the lambda sensor 70. The lambda sensor 70 converts this peak of oxygen into a voltage dip in the voltage signal that the lambda sensor 70 outputs.

Figure 3:
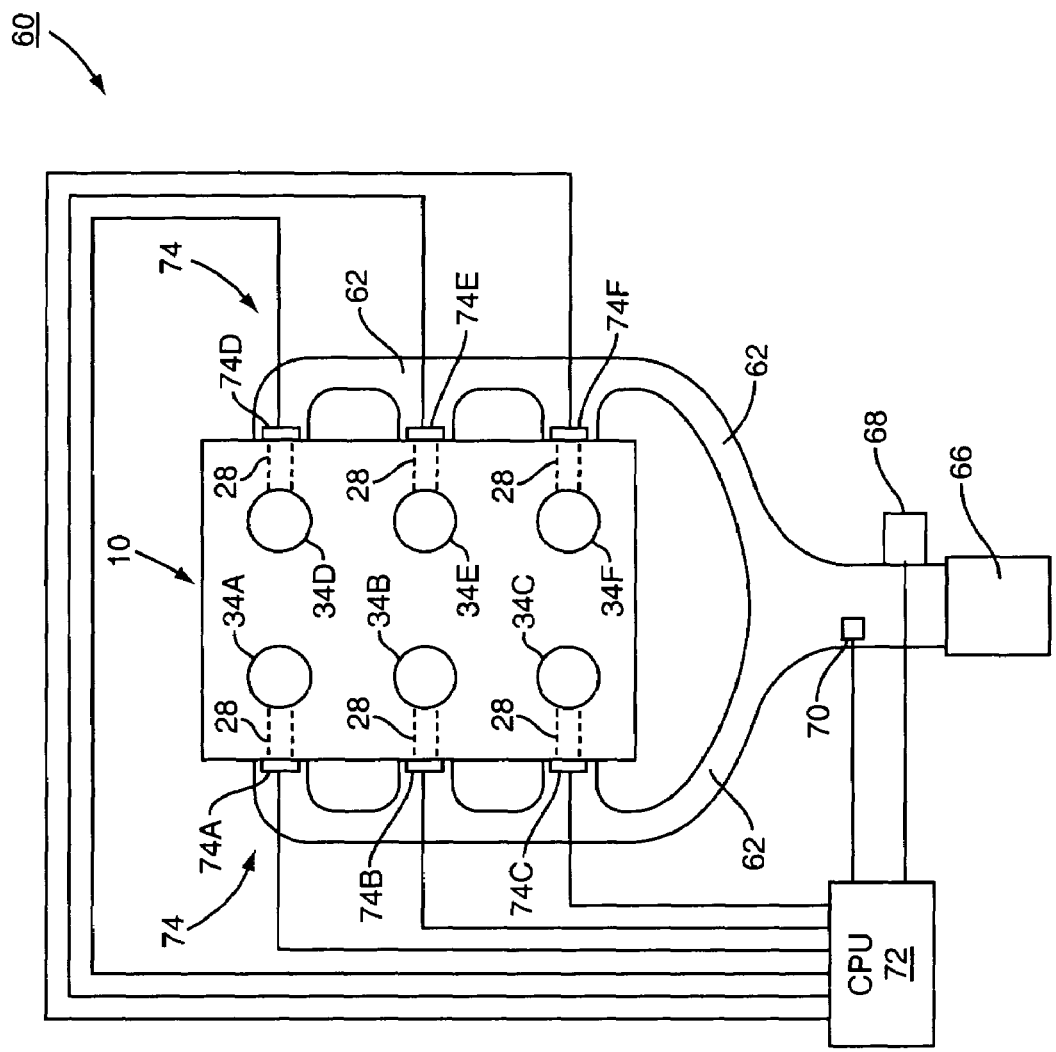
FIG. 3 illustrates a first exemplary embodiment of the present invention wherein the combustion inefficiency is detected by onboard components.

The present invention capitalizes on the dip in the voltage signal to determine which cylinder has combustion inefficiency. A first embodiment of the present invention is illustrated in FIG. 3. Specifically, in this first embodiment, additional oxygen sensors 74 (such as the BOSCH lamba sensor LSM 11) are positioned in or proximate to the exhaust ports 28 of each cylinder 34A–34F. Each additional oxygen sensor 74 communicates with the CPU 72 and may have a unique address 74A–74F by which the CPU 72 can discriminate there amongst. By positioning the oxygen sensors 74 in or proximate to the exhaust ports 28 of each cylinder 34A–34F, the CPU 72 may readily ascertain which cylinder 34A–34F has combustion inefficiency. For example, if oxygen sensor 74C detects a peak in the amount of oxygen, it is readily ascertainable that the cylinder 34C has combustion inefficiency.

While the preferred embodiment contemplates using oxygen sensors 74 such as the BOSCH LSM 11, it should be appreciated that other sensors could be used. For example, a hydrocarbon sensor could be used and directly detect the presence of fuel in the exhaust port 28. Alternatively, carbon dioxide, carbon monoxide, nitrogen or some other atmospheric gas could be detected and the presence or absence of peaks in the amount of that gas can be used to infer the absence of complete combustion. Still another type of oxygen sensor is a wide range air fuel ratio sensor. More information about such a sensor can be found at http://www.delphi.com/pdf/techpapers/2001-01-0558.pdf, a copy of which is submitted in the Information Disclosure Statement.

Further note that in the preferred embodiment, there is a unique oxygen sensor 74 for each cylinder 34 of the engine 10. While only six are shown in FIG. 3, it should be appreciated that a four cylinder engine would have four oxygen sensors 74, an eight cylinder engine would have eight oxygen sensors 74, etc. Likewise, the present invention works on different arrangements (V, straight, slant, hemi, etc.).

Because the CPU 72 is likely to be compliant with the onboard diagnostic (ODB-II) rules established by legislation in 1996, an error code such as "P03tt" can be generated based on signals from the oxygen sensors 74 and this error code may be stored by the CPU 72 as is well understood. As is further understood, "tt" is the cylinder 34 for which there is combustion inefficiency. Thus, for example, if the third cylinder 34C were misfiring, the code might be "P0303." Further, the malfunction indicator light (MIL, not shown) may be illuminated to alert the driver. It should be appreciated that there may have to be multiple instances of combustion inefficiencies to trigger the MIL. Appropriate thresholds could be set as needed or desired to avoid false positives. Further, combustion inefficiencies from a cold start may be ignored as needed or desired to avoid false positives. When a technician communicates with the CPU 72, the CPU 72 can indicate with great certainty which cylinder 34 has the combustion inefficiency that caused the MIL to be illuminated.

While the embodiment of FIG. 3 is suitable for newly built vehicles, it may be difficult or expensive to retrofit existing engines 10 with such functionality. While such a retrofit is not impossible, it is not preferred. For older engines, the second embodiment illustrated below is more appropriate.

Figure 4:
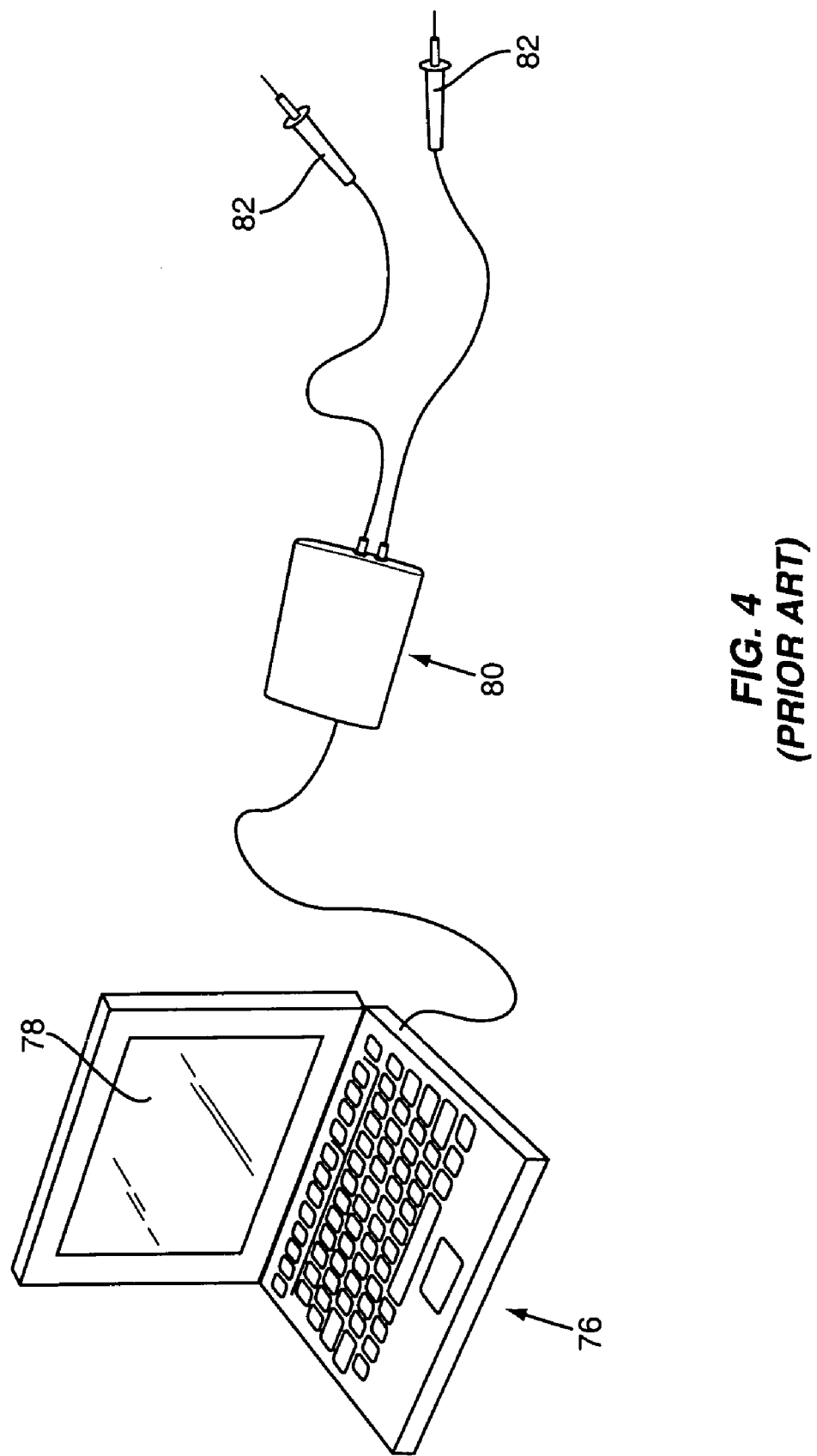
FIG. 4 illustrates a conventional testing device used by service technicians to monitor an oxygen sensor.

Before explaining the second embodiment, more background material may be helpful. A common tool that is used in service stations is a labscope. The labscope typically consists of a computer, such as a laptop 76 illustrated in FIG. 4, with a display 78. The laptop 76 has software running thereon as is well understood. The laptop 76 is further connected to an oscilloscope 80. The oscilloscope 80 has one or more probes 82 that can be used to measure voltage, current, or the like. An exemplary labscope package is sold by PICOTECH under the brand name PICO ADC 212/3. Information on such a scope can be found at www.picotech.com/auto/automotive_kit.html and more information on the ADC 212/3 specifically, is at http://www.picotech.com/auto/automotive_oscilloscope.html, copies of which are enclosed in the Information Disclosure Statement accompanying this disclosure.

A service technician may attach one of the probes 82 to the lambda sensor 70 and have the output of the lambda sensor 70 appear on the display 78. If a vehicle engine 10 is operating normally, the lambda sensor 70 may output a generally sinusoid pattern (generally 84) on the display 78, as illustrated in FIG. 5A. The higher the voltage, the less oxygen has been sensed by the lambda sensor 70. When there is combustion inefficiency, the sinusoid 84 develops what is called "hash." This is illustrated in FIG. 5B, wherein sinusoid 84A has dips and peaks 86, 88, respectively. If there is a recurring combustion inefficiency, the period between dips (generally shown at 90) will be essentially uniform. The recurring hash is the result of a cylinder 34 having an incomplete combustion.

Heretofore, experts have been unable to link this hash to a particular cylinder 34. The present invention provides this link. The present invention takes the output of the lambda sensor 70 and links it to a timing reference. The timing reference, in a preferred embodiment, is the time at which the spark plug 30 in the first cylinder 34A emits a spark.

Figure 6B:
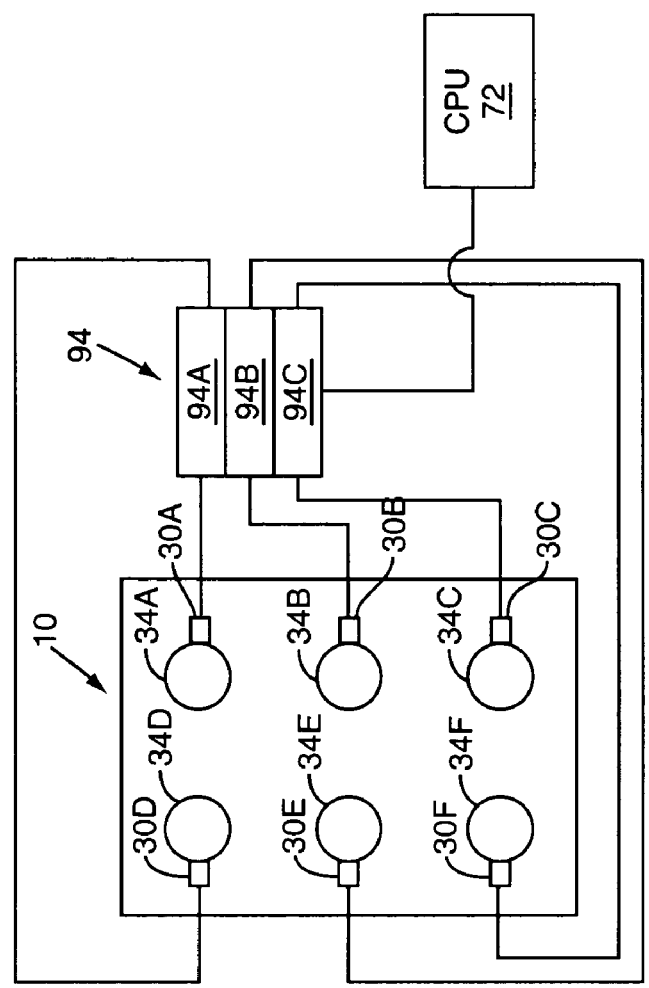
FIGS. 6A and 6B illustrate engine ignition systems.
Figure 6A:
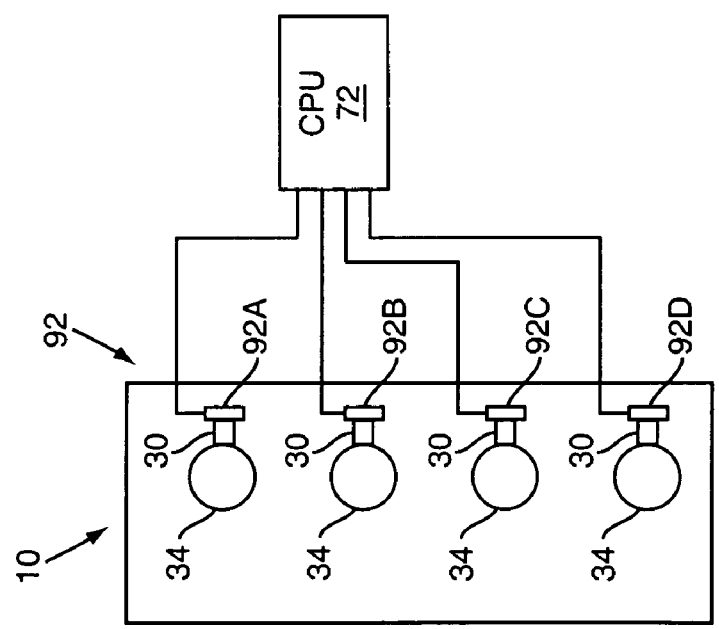

There are a number of steps that must be undertaken to provide the timing reference, and the sequence varies depending on the type of ignition system that is associated with the engine. Thus, more background information is necessary. The three types of ignition systems currently being made are coil on plug (COP), distributorless ignition systems (DIS), and a distributor system. The first two are illustrated in FIGS. 6A & 6B, respectively. In FIG. 6A, engine 10 has a COP system. Each sparkplug 30 has a coil 92A–92D (generically, coil 92) associated therewith. The CPU 72 is communicatively coupled to each of the coils 92A–92D. When a given cylinder 34 is in the ignition stroke of the Otto cycle, the CPU 72 sends a command to the appropriate coil 92, which in turn causes the appropriate spark plug 30 to emit a spark into the appropriate cylinder 34.

A DIS system is illustrated in FIG. 6B. A coil pack 94 is communicatively coupled to CPU 72. The coil pack 94 is divided into a number of coils 94A–94C. When a spark is needed in a given cylinder 34, for example cylinder 34B, the CPU 72 instructs the coil pack 94 to cause the appropriate coil 94B to trigger a spark. However, because coil 94B is connected to spark plugs 30B and 30E, both spark plugs 30B and 30E will emit sparks. As is well understood, the cylinders 34B and 34E are synchronized in the Otto cycle such that the spark is emitted in one cylinder during the combustion stroke and in the other cylinder during a period of time when there is no risk of combustion, such as the intake stroke.

Distributor systems are becoming increasingly less common, but a few still exist. A single coil emits a spark, and the spark is passed to a distributor that sits on top of the engine 10. The distributor rotates as the crankshaft 39 rotates and distributes the spark to the appropriate spark plug 30.

Getting the timing reference is relatively simple in a COP system. Probes 82 (FIG. 4) are connected to the lambda sensor 70 and the coil 92A corresponding to the first cylinder 34A of the engine. These two inputs may then be provided on the display 78. However, for a DIS, it is a little harder to determine the timing reference because the signal that triggers a spark in the first cylinder 34A may also trigger a spark in another cylinder, e.g., the fourth cylinder 34D and vice versa. Thus, to verify which pulse from the coil pack 94 is triggering the combustion in the first cylinder 34A, another step must be undertaken. Specifically, one probe 82 is connected to the spark plug 30A for the first cylinder 34A, and a second probe is connected to a fuel injector (not shown) associated with the companion cylinder 34D (companion in the sense that cylinder 34D is also triggered by coil pack 94A). The labscope will show a periodic signal corresponding to the signal from the coil 94A and another voltage peak corresponding to the signal from the CPU 72 that commands the fuel injector to inject fuel into the fourth cylinder 34D. The software of the present invention calculates a time difference between the command to the fuel injector and the command to emit the spark from the coil 94A. This time difference is termed herein an offset. Once the offset is determined, the probe 82 that was connected to the spark plug 30A is then detached and attached to the lambda sensor 70. The signal from the fuel injector is corrected by the offset to give a simulated spark plug signal for the first spark plug 30A and the two inputs are then provided on the display 78.

Likewise, for a distributor system, a similar offset may be calculated. Those skilled in the art will realize that the creation of the spark and the timing of the fuel injector are not the only ways in which the timing reference can be generated. In either the DIS or the distributor system, the signal as corrected by the offset acts as the timing reference.

Figure 7:
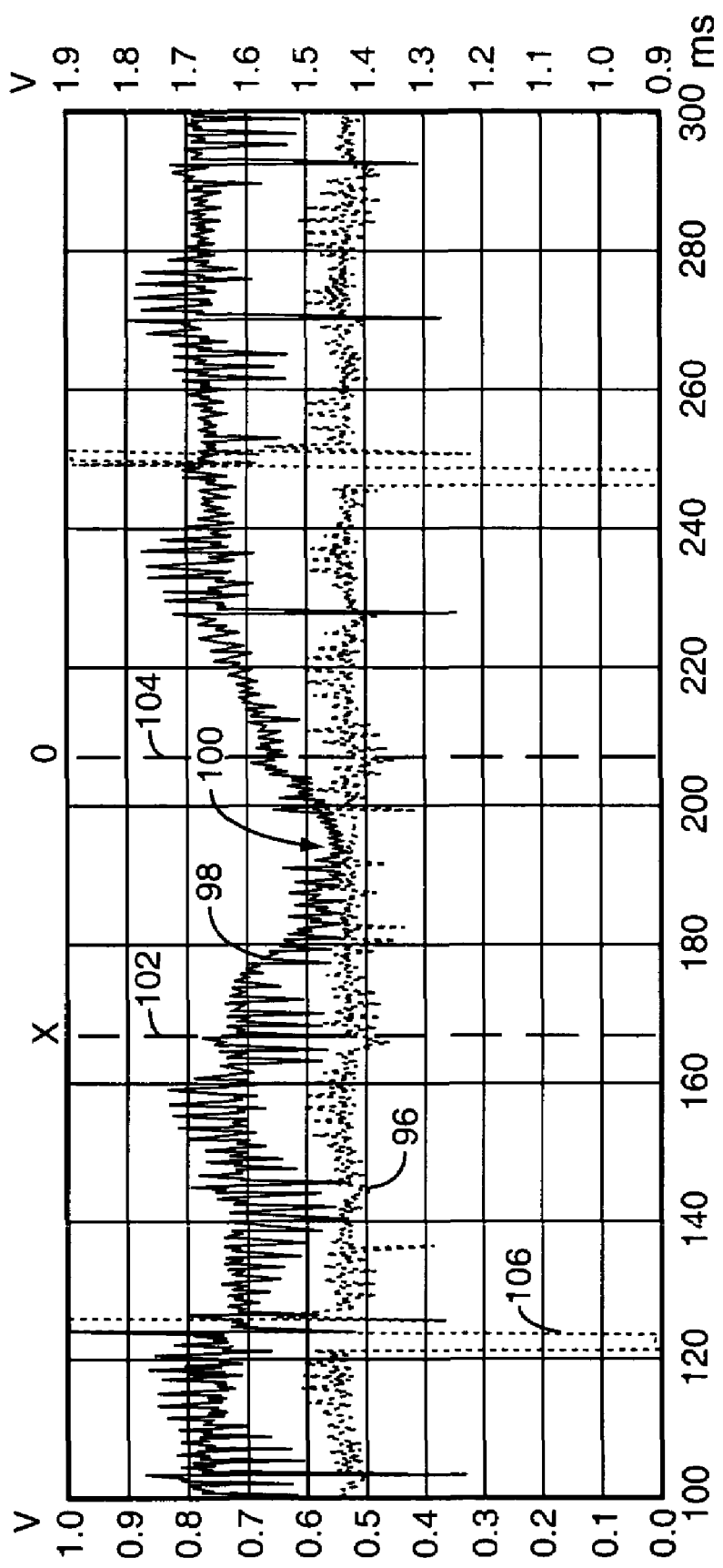
FIG. 7 illustrates a display of the testing device showing an ignition reference and the output of the oxygen sensor.

The resulting output from the spark plug 30A (derived directly, or through the aid of the offset) and the lambda sensor 70 looks something like the display illustrated in FIG. 7, where dotted line 96 corresponds to the spark plug signal and solid line 98 corresponds to the signal from the lambda sensor 70. Note that the time resolution in FIG. 7 for the lambda sensor 70 is finer than the nominal response time of 100–125 milliseconds. While convention wisdom suggests that lambda sensors have a response time of 100 milliseconds, in reality, lambda sensors respond much faster, and the present invention capitalizes on this fact. Here, a dip 100, denoted by lines 102, 104 is clearly visible in the signal from the lambda sensor 70. Note that this dip corresponds to the small dip 86 seen in FIG. 5B. This dip 100 begins approximately 40 msecs after the signal peak 106 to the spark plug 30. Alone, the dip 100 and the signal peak 106 are not particularly helpful. However, with the assistance of the present invention, the dip 100 and the signal peak 106 may be linked so as to identify which cylinder 34 has the combustion inefficiency that is creating the dip 100.

Figure 8:
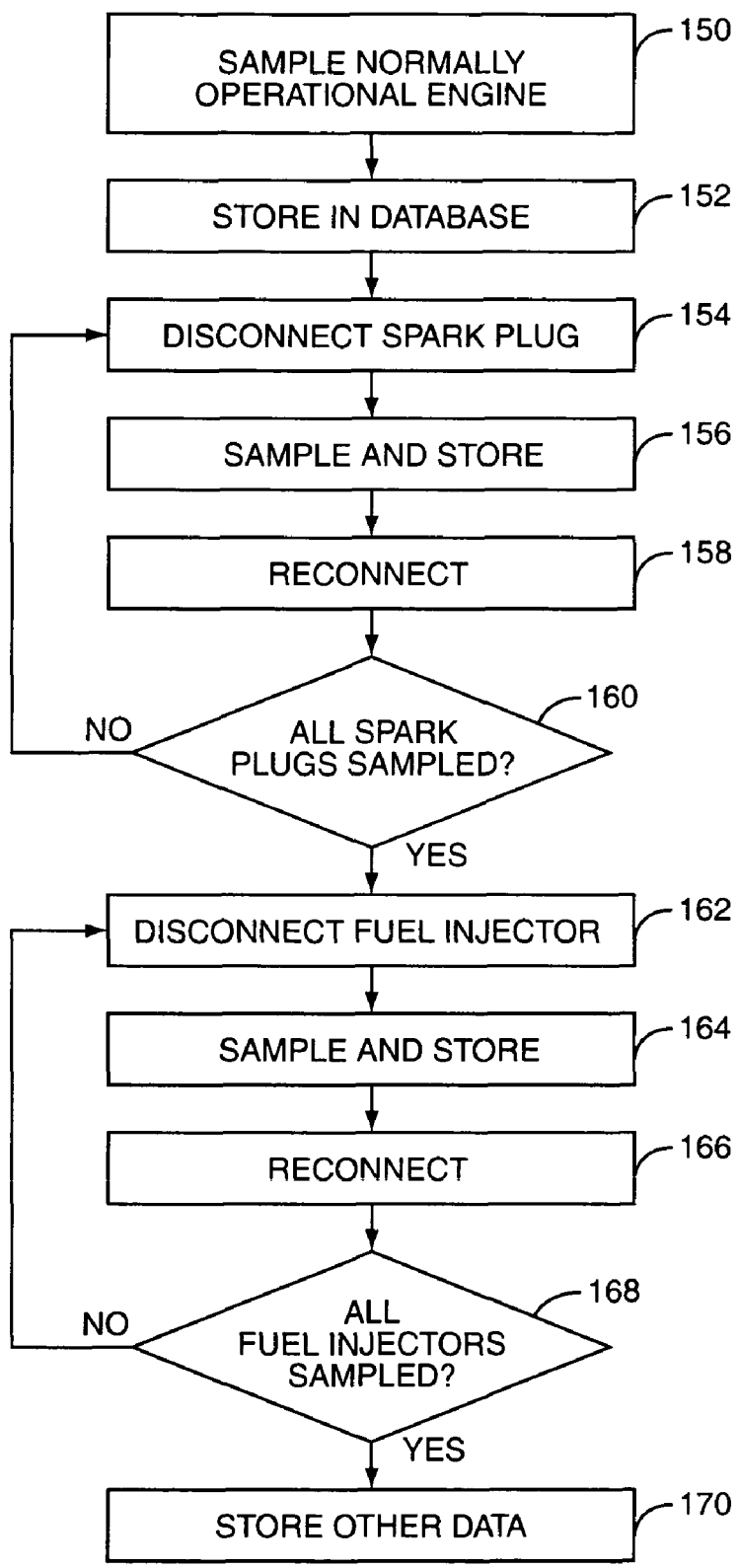
FIG. 8 illustrates a flow chart for an exemplary embodiment for creating the signature database.

Specifically, the present invention compares the data collected by the labscope to a known fingerprint of the engine 10. Based on the comparison, it can be determined what cylinder 34 has the combustion inefficiency. The creation of the fingerprints and assembly into a database is explained with reference to FIG. 8.

Initially, a normally working engine 10 must be acquired. This engine 10 must be free of combustion inefficiencies. This engine 10 is operated and sampled (block 150) by collecting data from the first spark plug 30A (directly or indirectly) and lambda sensor 70 as previously described. This sample is stored in a database format in associated memory (block 152). This provides a base line reference for the engine. Next, a technician disconnects a given spark plug 30 such that the given spark plug 30 cannot fire (block 154). Disconnecting a given spark plug 30 forces the associated cylinder 34 to misfire. The engine 10 is operated, sampled and the data stored (block 156). When stored, the data is flagged as to which spark plug was disconnected. The spark plug 30 is reconnected (block 158). It is then determined if all the spark plugs 30 have been sampled (block 160). If the answer is no, the process repeats, with the technician disconnecting the next spark plug 30 at block 156.

The sampling of disconnected spark plugs 30 continues until all the spark plugs 30 have been sampled. This creates fingerprints for misfires in each cylinder 34 of the engine 10. Once all the spark plugs 30 have been sampled and reconnected, the technician disconnects a fuel injector (block 162). Disconnecting a given fuel injector forces the associated cylinder 34 to misfire. The engine 10 is operated; the data is sampled and stored (block 164). When stored, the data is flagged as to which fuel injector had been disconnected. The technician reconnects the fuel injector (block 166) and determines if all the fuel injectors have been sampled (block 168). If the answer is no, then the process repeats until all the fuel injectors have been sampled. If the answer is yes, then the technician may provide other information about the engine 10 (block 170). This other information may include firing order, whether the engine is a distributor system, DIS or COP, the arrangement of the cylinders, the bank numbering of the cylinders, and the like.

This sampling provides a fingerprint or signature profile for the engine 10 in each of the most common misfire situations. The software of the present invention compares data from an engine 10 with an unknown problem to these fingerprints and can ascertain with great certainty that the data generated by the unknown problem is similar to one of the signatures or fingerprints stored in the database. Once the match has been made, the software references the flag associated with the dataset to determine which spark plug 30 or fuel injector causes this type of misfire. From this information, the software can inform the technician that it is likely that a particular spark plug 30 or fuel injector is not functioning properly. The technician can then check the suspected problem area and see if correction thereof corrects the unknown problem.

Figure 9:
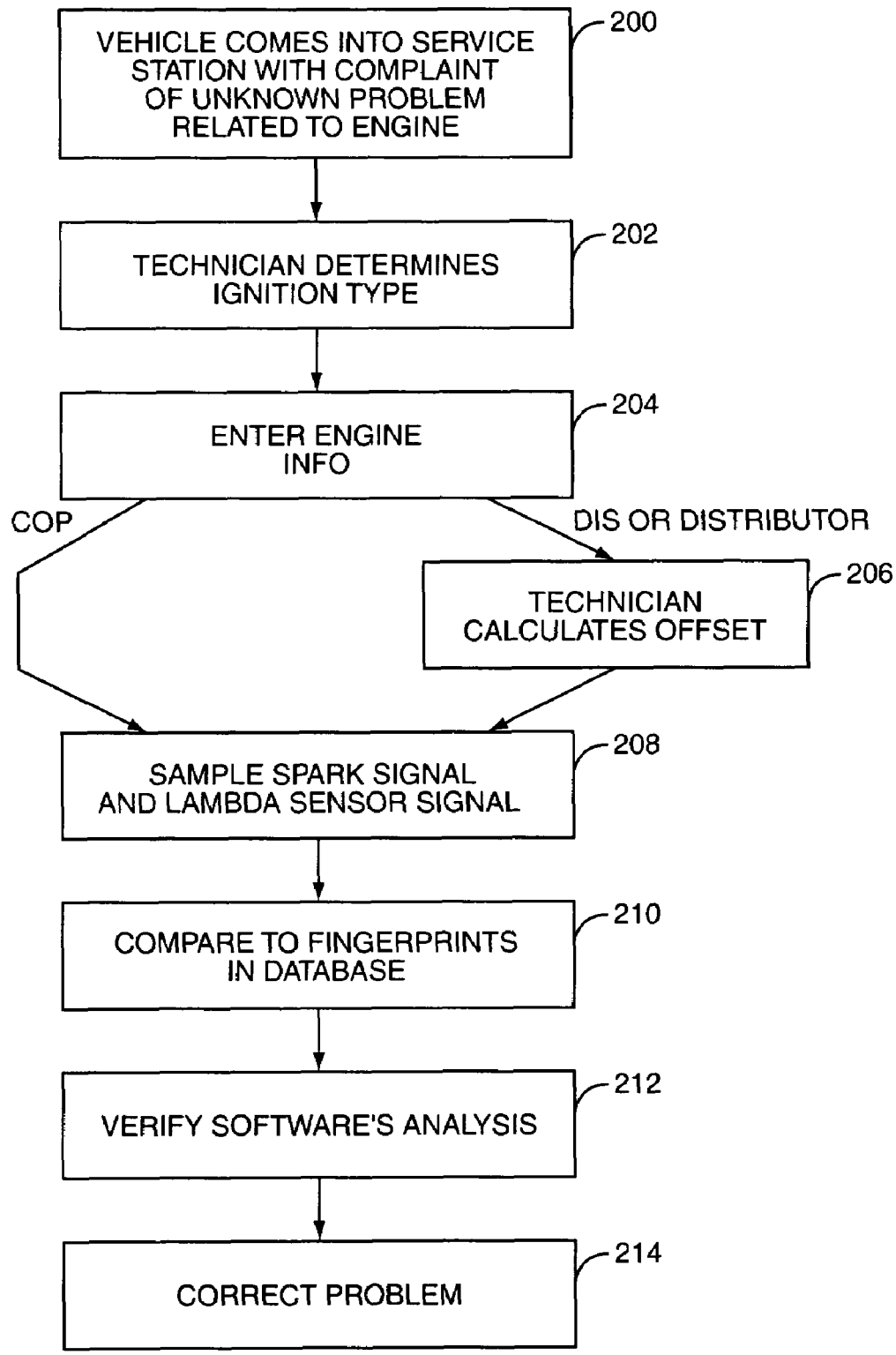
FIG. 9 illustrates a flow chart for testing an engine for combustion inefficiency.

In use, the present invention works as follows, with reference to FIG. 9. Specifically, a vehicle comes into a service station with a complaint of an unknown problem with the engine (block 200). This may be the result of the MIL being illuminated, a shaking in the car as the engine operates, or the like. The service station has the software of the present invention installed on a labscope or other comparable device that can collect data. The service technician initially determines what sort of ignition system is being used in the vehicle (block 202) and enters the engine information into the laptop 76 (block 204). The engine information may include the engine model, its size, its orientation, its numbering scheme, its firing order, the ignition system type, as well as any other information that may be helpful.

If a DIS is being used, the technician calculates the offset (block 206) as described above. If a COP system is being used, block 206 can be skipped. The technician then hooks the probes 82 to the appropriate place on the engine 10 to determine the timing reference and to the lambda sensor 70. The software samples the spark signal and the lambda sensor signal (block 208) and compares this information to the fingerprints in the database (block 210). Based on the comparison, the software may determine that a given cylinder 34's spark plug 30 is not operating or that a given cylinder 34's fuel injector is not operating and provide this information to the technician. At a minimum, the software may indicate which cylinder 34 has the combustion inefficiency.

The technician can then verify the software's analysis (block 212) by checking the indicated spark plug 30 or fuel injector. If the problem was not indicated as being in the spark plug 30 or the fuel injector, the technician can check the seals of the cylinder 34 or perform other tests as appropriate to see what might be the problem with the indicated cylinder 34. Once the problem is identified, the technician may correct the problem (block 214) as appropriate.

Figure 10:
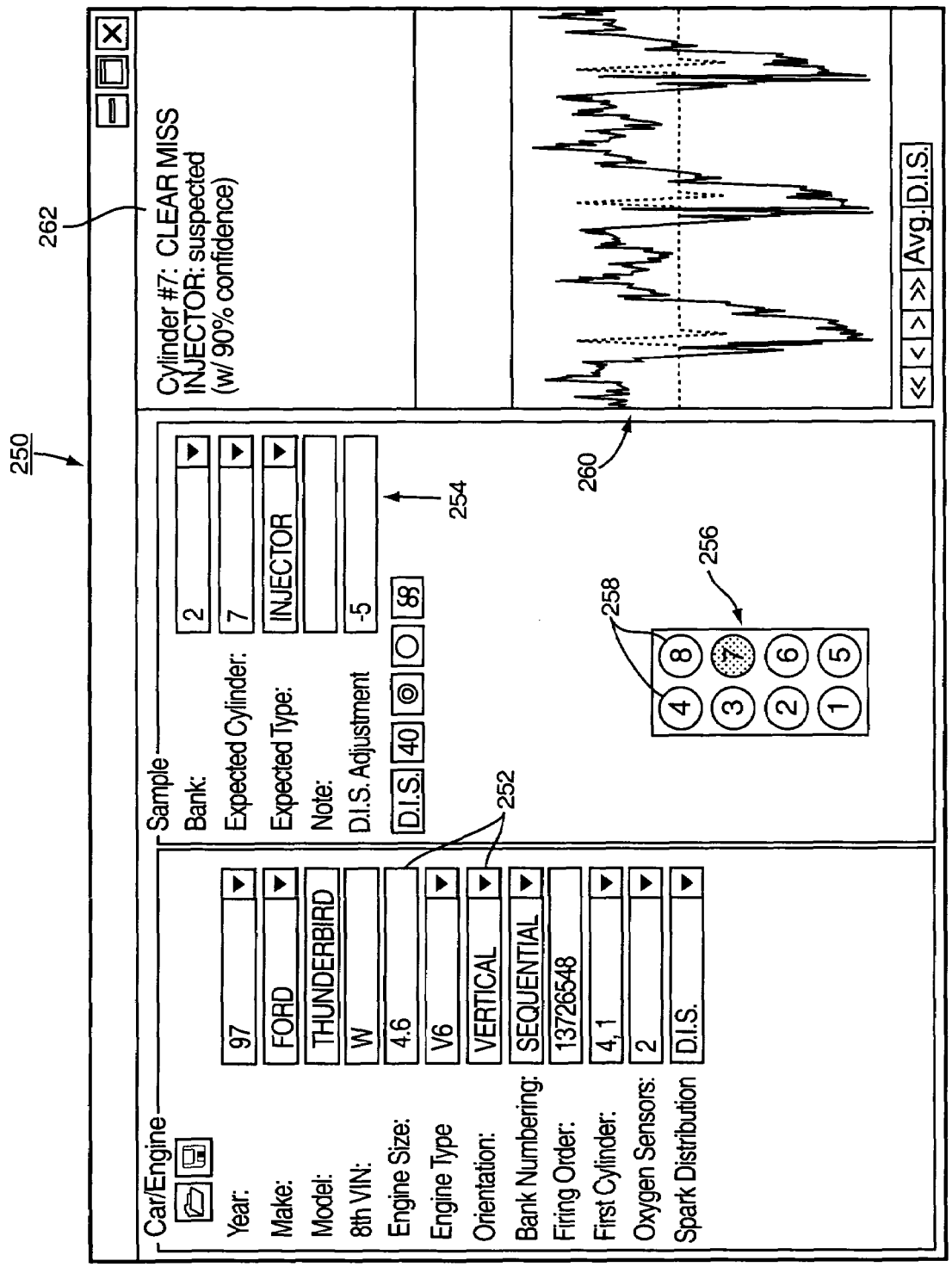
FIG. 10 illustrates an exemplary graphical user interface for use with the present invention.

An exemplary graphical user interface (GUI) 250 for the software of the present invention is illustrated in FIG. 10. It should be appreciated that this software may be stored in any appropriate computer readable medium that can be used by the laptop 76 or other computer. Exemplary computer readable media include floppy disks, CDs, hard drives, optical disks, EEPROM, EPROM, flash memory, a USB memory stick, and the like. The GUI 250 includes multiple fields 252 that allow entry of information relevant to the engine so that the software may make the appropriate comparisons. Exemplary fields include the year of the vehicle, the make and model of the vehicle, the $8^{th}$ VIN digit, the engine size, the engine type, its orientation, its bank numbering, the firing order, the first cylinder, the number of oxygen sensors, and the spark distribution system (DIS or COP). Additional fields 254 may be present to accommodate the calculation of the offset. These fields may include the DIS adjustment (the offset), any information derived from the CPU 72 as a function of the ODB-II functionality, and the like.

Based on the orientation, the bank numbering, and the indication of which is the first cylinder, a graphical model 256 of the engine 10 may be presented. The graphical model 256 may have the cylinders 258 numbered and shown thereon in such a manner that conforms to the orientation, numbering and first cylinder indication provided in fields 252. Additionally, the data from the labscope may be displayed in screen 260. Finally, the determination of the software may be output in a field 262.

Before the software makes its conclusion, it may provide a visual representation of how the engine is working. For example, the cylinders 258 may be black as a default. As the software checks the cylinder 34 being fired, and the check is okay, the cylinder 258 may be briefly illuminated with a green color. If the check is negative, the cylinder 258 may be briefly illuminated with a red color. After the software makes it conclusion, the problematic cylinder 34 may be indicated by illuminating the appropriate cylinder 258 with red and maintaining this illumination.

It should be appreciated that other GUIs can be used and other output mechanisms could be used to convey the same information. However, this GUI 250 is provided as an example of one way in which the software could be implemented. It should also be appreciated that while presently Applicant prefers the fingerprint method to determine which cylinder 34 has the combustion inefficiency, there may be other mechanisms that allow the timing reference and lambda sensor 70 to be linked. For example, it should be possible to place a tracking element, such as a radioactive isotope of iodine in a known cylinder 34 and time how long it takes the isotope to get from the cylinder 34 to the lambda sensor 70. This would perhaps be indicative of how long it takes a given exhaust event from the cylinder 34 to reach the lambda sensor 70. This number could be added to or subtracted from a time at which a dip was detected at the lambda sensor 70 and linked to a specific cylinder 34. Likewise, there may be other ways to generate offsets or timing references. Distributors are mechanical devices, so a rotational position thereof may be the timing reference. Likewise, a rotational position of a crankshaft 39 or camshaft 32 may be used as the timing reference. However, different fingerprints or signatures may be required for these different timing references as should be readily apparent to those skilled in the art.

Further note that while the present invention has been described as being used in the context of an automobile engine, the present invention is not so limited. The present invention could be used in boat, airplane, electric generator or other contexts that have an internal combustion engine.

Those skilled in the art will recognize improvements and modifications to the preferred embodiments of the present invention. All such improvements and modifications are considered within the scope of the concepts disclosed herein and the claims that follow.

What is claimed is:

1. A method of detecting combustion inefficiency in an engine having multiple cylinders, comprising:
    detecting oxygen levels in an exhaust stream with a sensor;
    connecting the sensor to an external probe;
    comparing sensor readings to a database of fingerprints associated with the external probe, wherein the database of fingerprints comprises fingerprints of engines having combustion inefficiencies; and
    providing an indication as to which cylinder has the combustion inefficiency.

2. The method of claim 1 wherein detecting the oxygen levels with the sensor comprises using a lambda sensor.

3. The method of claim 2 wherein using the lambda sensor comprises using a lambda sensor positioned in an exhaust manifold.

4. The method of claim 2 wherein using the lambda sensor comprises using a lambda sensor positioned proximate a catalytic converter.

5. The method of claim 1 wherein comparing sensor readings to the database of fingerprints comprises linking a peak in the oxygen levels to a particular cylinder in the engine so as to identify a misfire in the particular cylinder.

6. The method of claim 1, wherein the database of fingerprints is derived empirically.

7. The method of claim 1 wherein detecting the peak in the oxygen level comprises directly detecting the oxygen levels.

8. The method of claim 1 wherein detecting the peak in the oxygen levels comprises inferentially detecting the oxygen levels.

9. The method of claim 1 further comprising generating a timing reference associated with the engine.

10. The method of claim 9 further comprising linking the timing reference to the database of fingerprints.

11. The method of claim 6 wherein the database of fingerprints has different fingerprints for different types of engines.

12. The method of claim 6 wherein the database of fingerprints is derived empirically by introducing known combustion inefficiencies and recording oxygen levels for the known combustion inefficiencies.

13. The method of claim 1 further comprising using a known firing order of the multiple cylinders to assist in determining which cylinder released exhaust gases detected by the sensor.

14. A computer readable medium having software stored thereon, said software adapted to detect combustion inefficiency in an engine having multiple cylinders by:
    accepting data from a sensor through an external probe;
    comparing sensed oxygen levels from the sensor coupled with a timing reference to a database of fingerprints, wherein the database of fingerprints comprises fingerprints of engines having combustion inefficiencies; and
    providing an indication as to which cylinder has the combustion inefficiency.

15. The computer readable medium of claim 14 wherein said software accepting data from the sensor through the external probe is adapted to operate with an external probe connected to a lambda sensor and a timing reference generator.

16. The computer readable medium of claim 14 wherein said software is adapted to identify that the cylinder is misfiring.

17. The computer readable medium of claim 14 wherein said software is adapted to generate the timing reference for engines selected from a group consisting of those using a distributorless ignition system (DIS) and those using a distributor system through the calculation of an offset.

18. The computer readable medium of claim 14 wherein said software is adapted to accept data from the sensor through the external probe is adapted to work with a sensor that senses oxygen levels indirectly.

19. The computer readable medium of claim 14 wherein the database of fingerprints comprises a database of fingerprints relating to empirically derived oxygen levels.

20. The computer readable medium of claim 19 wherein the empirically derived oxygen levels are derived from introducing a known combustion inefficiency into a normally operating engine and wherein said fingerprints comprise data related to oxygen levels detected in an exhaust path associated with the normally operating engine.

21. A method of detecting a misfire in an engine having multiple cylinders comprising:
    connecting an external probe to a sensor associated with an exhaust path of the engine;
    collecting readings from the sensor relating to oxygen levels within the exhaust path;
    comparing, through software, the oxygen levels collected from the sensor to a database of fingerprints; and
    providing an indication as to which of the multiple cylinders is misfiring.

22. The method of claim 21 further comprising forming the database of fingerprints empirically.

23. The method of claim 22 wherein forming the database empirically comprises, for a given model of engine, sequentially introducing a known misfire into each cylinder of the given model of engine and recording oxygen levels associated with each introduced known misfire for each cylinder and associating each recording of oxygen levels with a timing reference.

24. The method of claim 23 wherein comparing, through software, the oxygen levels collected from the sensor to the database comprises identifying to the software a type of engine being tested and comparing the type of engine to a corresponding type of engine in the database of fingerprints.

25. The method of claim 23 further comprising identifying a cylinder within the engine that has a combustion inefficiency short of a misfire instead of providing the indication as to which of the multiple cylinders is misfiring.

* * * * *